(12) United States Patent
Minami et al.

(10) Patent No.: US 10,276,890 B2
(45) Date of Patent: Apr. 30, 2019

(54) NONAQUEOUS ELECTROLYTE SECONDARY BATTERY AND METHOD FOR MANUFACTURING THE SAME

(71) Applicant: SANYO Electric Co., Ltd., Daito-shi, Osaka (JP)

(72) Inventors: Keisuke Minami, Hyogo (JP); Yukari Kuratomi, Hyogo (JP); Masao Inoue, Hyogo (JP); Toyoki Fujihara, Hyogo (JP); Naoya Nakanishi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 158 days.

(21) Appl. No.: 15/189,495

(22) Filed: Jun. 22, 2016

(65) Prior Publication Data

US 2016/0380303 A1 Dec. 29, 2016

(30) Foreign Application Priority Data

Jun. 24, 2015 (JP) .................................. 2015-126143

(51) Int. Cl.
  *H01M 10/0525* (2010.01)
  *H01M 10/0587* (2010.01)
  *H01M 2/34* (2006.01)
  *H01M 10/04* (2006.01)
  *H01M 4/485* (2010.01)
  (Continued)

(52) U.S. Cl.
  CPC ....... *H01M 10/0525* (2013.01); *H01M 2/345* (2013.01); *H01M 4/485* (2013.01); *H01M 4/58* (2013.01); *H01M 4/587* (2013.01); *H01M 4/5825* (2013.01); *H01M 10/0431* (2013.01); *H01M 10/0567* (2013.01); (Continued)

(58) Field of Classification Search
  CPC .... H01M 10/0525; H01M 4/58; H01M 4/485; H01M 10/0567; H01M 4/587; H01M 4/5825; H01M 10/0431; H01M 2/345; H01M 10/0587; H01M 2220/20; H01M 2004/028; Y02E 60/122
  See application file for complete search history.

(56) References Cited

U.S. PATENT DOCUMENTS

2008/0038627 A1  2/2008 Yamauchi et al.
2010/0209765 A1  8/2010 Bak
(Continued)

FOREIGN PATENT DOCUMENTS

JP  2008-066254 A  3/2008
JP  2011-187440 A  9/2011
(Continued)

*Primary Examiner* — Lisa S Park
(74) *Attorney, Agent, or Firm* — Westerman, Hattori, Daniels & Adrian, LLP (57) ABSTRACT

A nonaqueous electrolyte secondary battery includes a prismatic housing having an opening and a sealing member sealing the opening. The prismatic housing contains a flat-wound electrode assembly and a nonaqueous electrolyte. The flat-wound electrode assembly includes a positive electrode and a negative electrode. The positive electrode includes a positive electrode substrate and a positive electrode active material mixture layer formed on the positive electrode substrate. The positive electrode active material mixture layer contains lithium carbonate and lithium phosphate. The nonaqueous electrolyte contains lithium fluorosulfonate.

6 Claims, 4 Drawing Sheets

(51) Int. Cl.
*H01M 4/58* (2010.01)
*H01M 4/587* (2010.01)
*H01M 10/0567* (2010.01)
*H01M 4/02* (2006.01)

(52) U.S. Cl.
CPC .. *H01M 10/0587* (2013.01); *H01M 2004/028* (2013.01); *H01M 2220/20* (2013.01); *Y02E 60/122* (2013.01)

(56) References Cited

U.S. PATENT DOCUMENTS

| | | | |
|---|---|---|---|
| 2011/0039160 A1 | 2/2011 | Takahata et al. | |
| 2011/0117432 A1 | 5/2011 | Kay | |
| 2011/0177364 A1* | 7/2011 | Miyazaki | H01M 4/131 429/53 |
| 2012/0244425 A1 | 9/2012 | Tokuda | |
| 2012/0308881 A1* | 12/2012 | Tokuda | H01M 10/0567 429/199 |
| 2012/0315515 A1* | 12/2012 | Guen | H01M 2/0473 429/56 |
| 2013/0089759 A1* | 4/2013 | Han | H01M 2/0408 429/61 |
| 2013/0280622 A1 | 10/2013 | Tokuda et al. | |
| 2013/0309564 A1 | 11/2013 | Yoshida et al. | |
| 2014/0045002 A1 | 2/2014 | Yokoyama et al. | |
| 2016/0013517 A1 | 1/2016 | Nakazawa et al. | |

FOREIGN PATENT DOCUMENTS

| | | |
|---|---|---|
| JP | 2011-528483 A | 11/2011 |
| JP | 2014-035897 A | 2/2014 |
| JP | 2015-026625 A | 2/2015 |
| WO | 2014/157591 A1 | 10/2014 |

* cited by examiner

NONAQUEOUS ELECTROLYTE SECONDARY BATTERY AND METHOD FOR MANUFACTURING THE SAME

CROSS REFERENCE TO RELATED APPLICATIONS

The present invention application claims priority to Japanese Patent Application No. 2015-126143 filed in the Japan Patent Office on Jun. 24, 2015, the entire contents of which are incorporated herein by reference.

BACKGROUND OF THE INVENTION

Field of the Invention

The present invention relates to nonaqueous electrolyte secondary batteries and methods for manufacturing such batteries.

Description of Related Art

Recently, nonaqueous electrolyte secondary batteries with high energy densities have been used for applications such as power supplies for driving hybrid electric vehicles (PHEVs and HEVs) and electric vehicles (EVs). There is a growing need for a nonaqueous electrolyte secondary battery with a higher performance for such applications.

Japanese Published Unexamined Patent Application No. 2011-187440 (Patent document 1) proposes a technique involving the use of a nonaqueous electrolyte containing lithium fluorosulfonate.

BRIEF SUMMARY OF THE INVENTION

An object of the present invention is to provide a nonaqueous electrolyte secondary battery with good low-temperature output characteristics and high-temperature storage characteristics.

A first aspect of the present invention provides a nonaqueous electrolyte secondary battery. This nonaqueous electrolyte secondary battery includes an electrode assembly and a nonaqueous electrolyte. The electrode assembly includes a positive electrode and a negative electrode. The positive electrode contains a positive electrode active material, lithium carbonate, and lithium phosphate. The negative electrode contains a negative electrode active material. The nonaqueous electrolyte contains lithium fluorosulfonate.

The thus-configured nonaqueous electrolyte secondary battery has good low-temperature output characteristics and high-temperature storage characteristics.

The nonaqueous electrolyte secondary battery according to the first aspect of the present invention preferably further includes a housing having an opening and containing the electrode assembly and the nonaqueous electrolyte, a sealing member sealing the opening, a terminal attached to the sealing member and electrically connected to the positive electrode or the negative electrode, and a current-interrupting mechanism disposed on a conduction path between the positive electrode or the negative electrode and the terminal. The current-interrupting mechanism is activated to break the conduction path and thereby interrupt a current therethrough when the internal pressure of the battery reaches a predetermined level or higher. This nonaqueous electrolyte secondary battery is reliable against overcharge.

The nonaqueous electrolyte secondary battery according to the first aspect of the present invention preferably further includes a housing having an opening and containing the electrode assembly and the nonaqueous electrolyte, a sealing member sealing the opening, a terminal attached to the sealing member and electrically connected to the positive electrode or the negative electrode, and a short-circuiting mechanism that is activated to forcedly short-circuit the positive electrode and the negative electrode when the internal pressure of the battery reaches a predetermined level or higher. This nonaqueous electrolyte secondary battery is reliable against overcharge. The nonaqueous electrolyte secondary battery preferably further includes a fusible portion disposed on a conduction path between the positive electrode or the negative electrode and the terminal. The fusible portion is blown by a short-circuit current upon activation of the short-circuiting mechanism.

The positive electrode active material is preferably a lithium transition metal oxide, and the negative electrode active material is preferably a carbonaceous material. The lithium transition metal oxide preferably contains at least one transition metal selected from nickel, cobalt, and manganese. Preferred carbonaceous materials include graphite and amorphous carbon.

A second aspect of the present invention provides a method for manufacturing a nonaqueous electrolyte secondary battery. This nonaqueous electrolyte secondary battery includes an electrode assembly, a nonaqueous electrolyte, a housing having an opening and containing the electrode assembly and the nonaqueous electrolyte, and a sealing member sealing the opening. The electrode assembly includes a positive electrode and a negative electrode. The positive electrode contains a positive electrode active material, lithium carbonate, and lithium phosphate. The negative electrode contains a negative electrode active material. The nonaqueous electrolyte contains lithium fluorosulfonate. This method includes placing the nonaqueous electrolyte in the housing.

DETAILED DESCRIPTION OF THE INVENTION

Embodiments of the present invention will now be described in detail. It should be noted that the following embodiments are provided for illustration purposes only and are not intended to limit the invention.

Figure 1A:
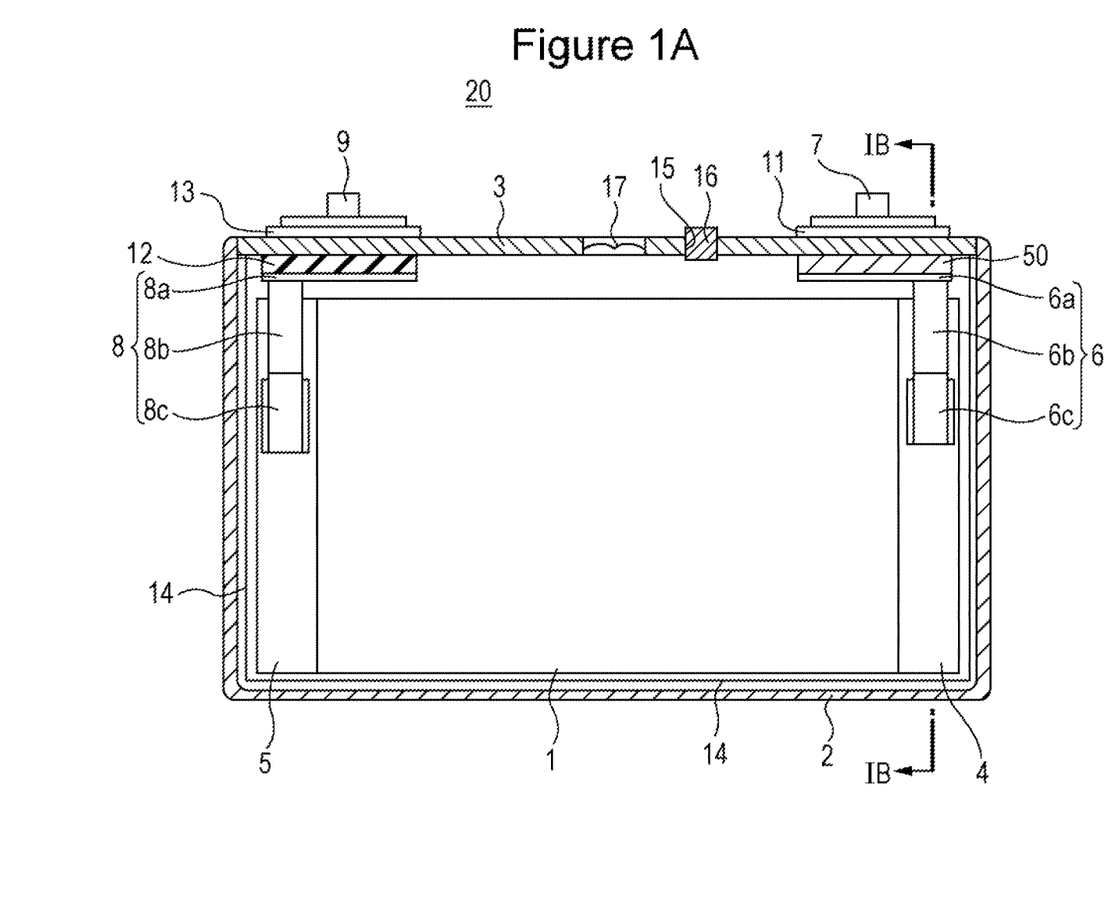
FIG. 1A is a sectional view of a nonaqueous electrolyte secondary battery according to an embodiment.
Figure 1B:
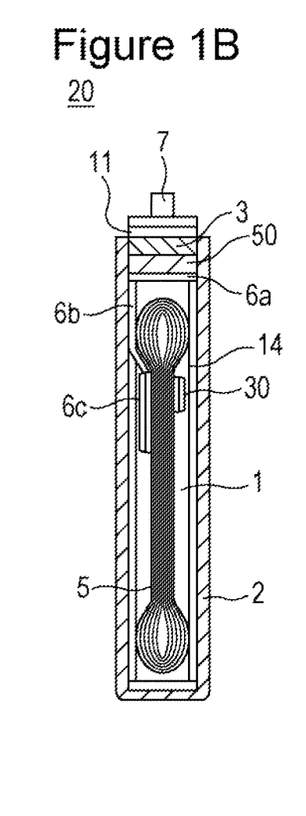
FIG. 1B is a sectional view taken along line IB-IB in FIG. 1A.

As shown in FIGS. 1A and 1B, a nonaqueous electrolyte secondary battery 20 includes a flat-wound electrode assembly 1 in which a positive electrode 21 and a negative electrode 22 are wound together with a separator therebetween.

Figure 3:
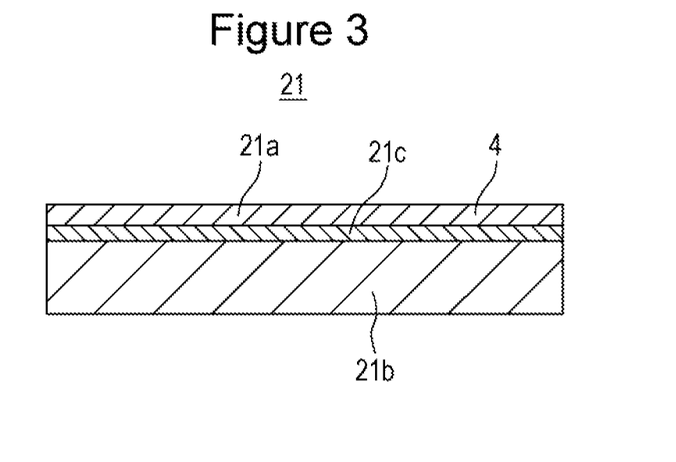
FIG. 3 is a plan view of a positive electrode.

As shown in FIG. 3, the positive electrode 21 includes a positive electrode substrate 21a made of aluminum or aluminum alloy and a positive electrode active material mixture layer 21b formed on each side of the positive electrode substrate 21a. The positive electrode 21 has an exposed region 4 of the positive electrode substrate 21a formed on each side of the positive electrode 21. The exposed region 4 of the positive electrode substrate 21a is strip-shaped and extends longitudinally along one lateral edge of the positive electrode 21. A positive electrode protective layer 21c is formed on the positive electrode substrate 21a along one edge of the positive electrode active material mixture layer 21b. The positive electrode protective layer 21c may be omitted.

Figure 4:
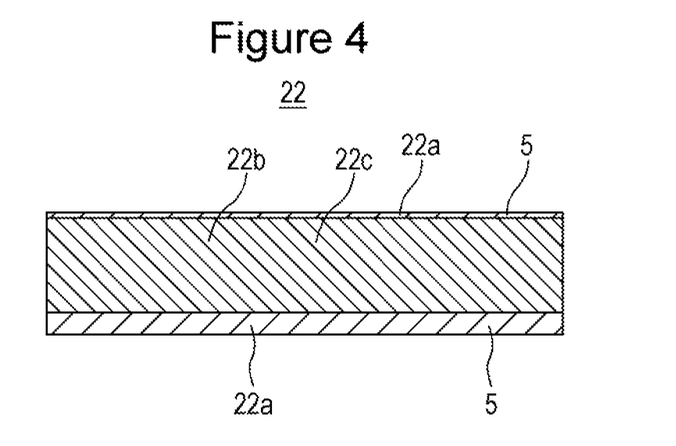
FIG. 4 is a plan view of a negative electrode.

As shown in FIG. 4, the negative electrode 22 includes a negative electrode substrate 22a made of copper or copper alloy and a negative electrode active material mixture layer 22b formed on each side of the negative electrode substrate 22a. The negative electrode 22 has an exposed region 5 of the negative electrode substrate 22a formed along each edge of the negative electrode 22. The exposed region 5 of the negative electrode substrate 22a is strip-shaped and extends longitudinally along each lateral edge of the negative electrode 22. Alternatively, the negative electrode 22 may have the exposed region 5 of the negative electrode substrate 22a formed only along one lateral edge of the negative electrode 22. A negative electrode protective layer 22c containing ceramic particles and a binder is formed on the negative electrode active material mixture layer 22b. The negative electrode protective layer 22c may be omitted.

The flat-wound electrode assembly 1 is constructed by winding together the positive electrode 21 and the negative electrode 22 with the separator therebetween and forming them into a flat shape. This is done such that the exposed region 4 of the positive electrode substrate 21a and the exposed region 5 of the negative electrode substrate 22a are wound at the opposite ends of the flat-wound electrode assembly 1.

The exposed region 4 of the positive electrode substrate 21a is electrically connected to a positive electrode terminal 7 via a positive electrode current collector 6. The exposed region 5 of the negative electrode substrate 22a is electrically connected to a negative electrode terminal 9 via a negative electrode current collector 8. The positive electrode current collector 6 and the positive electrode terminal 7 are preferably made of aluminun or aluminum alloy. The negative electrode current collector 8 and the negative electrode terminal 9 are preferably made of copper or copper alloy. The positive electrode terminal 7 includes a flange 7a and an insertion portion 7b formed on one side of the flange 7a. The insertion portion 7b is inserted into a terminal mounting hole formed in a sealing member 3. The negative electrode terminal 9 includes a flange 9a and an insertion portion 9b formed on one side of the flange 9a. The insertion portion 9b is inserted into a terminal mounting hole formed in the sealing member 3.

A current-interrupting mechanism 50 is disposed on the conduction path between the positive electrode 21 and the positive electrode terminal 7. When the internal pressure of the battery 20 reaches a predetermined level or higher, the current-interrupting mechanism 50 is activated to break the conduction path between the positive electrode 21 and the positive electrode terminal 7 and thereby interrupt a current therethrough.

The positive electrode terminal 7 is attached to the sealing member 3 with an outer insulator 11 therebetween. The negative electrode terminal 9 is attached to the sealing member 3 with an outer insulator 13 therebetween.

The flat-wound electrode assembly 1 is covered with a resin insulating sheet 14 and is contained in a metal prismatic housing 2. The sealing member 3 is fitted and laser-welded to the opening edge of the prismatic housing 2.

The sealing member 3 has a liquid electrolyte inlet 15 through which a nonaqueous liquid electrolyte is injected. The liquid electrolyte inlet 15 is sealed by a sealing plug 16 such as a blind rivet. The sealing member 3 also has a gas release valve 17 that ruptures and releases gas from the battery 20 when the internal pressure of the battery 20 exceeds the activation pressure of the current-interrupting mechanism 50.

Figure 2:
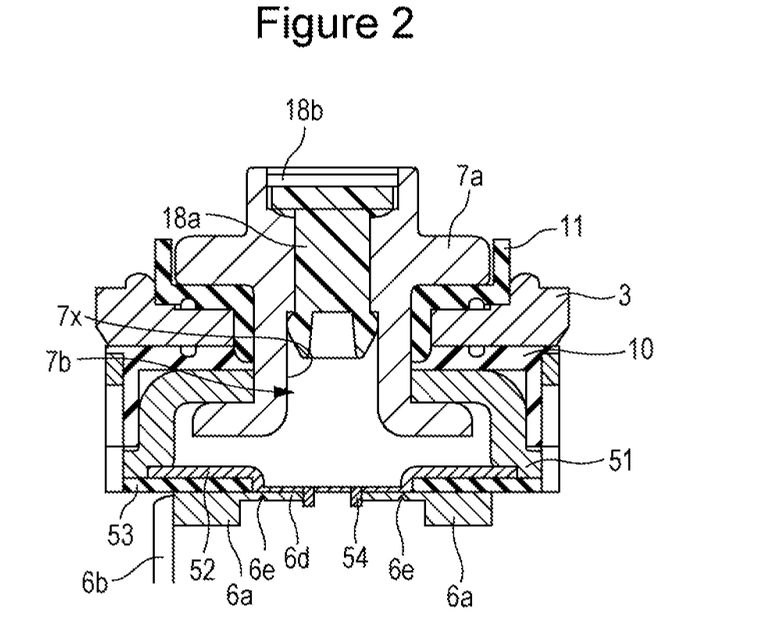
FIG. 2 is an enlarged view of the area around a current-interrupting mechanism in FIG. 1B.

The construction of the current-interrupting mechanism 50 disposed in the nonaqueous electrolyte secondary battery 20 will now be described with reference to FIG. 2. FIG. 2 is an enlarged view of the area around the current-interrupting mechanism 50 along the thickness of the nonaqueous electrolyte secondary battery 20.

The positive electrode terminal 7 includes the flange 7a and the insertion portion 7b and has a through-hole 7x formed inside. The insertion portion 7b of the positive electrode terminal 7 is inserted into through-holes formed in the outer insulator 11, the sealing member 3, a first insulator 10, and a conductor 51. The end of the insertion portion 7b is crimped to hold together the positive electrode terminal 7, the outer insulator 11, the sealing member 3, the first insulator 10, and the conductor 51.

The periphery of a deformable plate 52 is welded to the lower edge of a cylindrical portion of the conductor 51. A thin portion 6d of a base 6a of the positive electrode current collector 6 is laser-welded to the center of the deformable plate 52 to form a joint 54. In this way, the exposed region 4 of the positive electrode substrate 21a is electrically connected to the positive electrode terminal 7 via the positive electrode current collector 6, the deformable plate 52, and the conductor 51. The thin portion 6d has an annular groove 6e formed around the joint 54.

When the internal pressure of the prismatic housing 2 exceeds a predetermined level, the deformable plate 52 deforms such that the center thereof is inverted toward the sealing member 3. The deformation of the deformable plate 52 causes the thin portion 6d of the positive electrode current collector 6 to rupture at the annular groove 6e, thus breaking the conduction path.

The through-hole 7x formed in the positive electrode terminal 7 is sealed by a terminal plug 18. The terminal plug 18 includes an elastic member 18a and a metal plate 18b.

Although the current-interrupting mechanism illustrated in this embodiment is disposed on the conduction path of the positive electrode, it may instead be disposed on the conduction path of the negative electrode.

Methods for manufacturing the positive electrode 21, the negative electrode 22, the flat-wound electrode assembly 1, and the nonaqueous liquid electrolyte used as the nonaqueous electrolyte for the nouaqueous electrolyte secondary battery 20 will now be described.

Fabrication of Positive Electrode

A lithium transition metal oxide represented by the formula $Li(Ni_{0.35}Co_{0.35}Mn_{0.35})_{0.995}Zr_{0.005}O_2$ is used as a positive electrode active material. A positive electrode mixture slimy is prepared by weighing the lithium transition metal oxide, carbon powder, serving as a conductor, polyvinylidene fluoride (PVdF), serving as a binder, lithium carbonate, and lithium phosphate in a mass ratio of 87.2:7:2:

2:1.8 and mixing them with N-methyl-2-pyrrolidone (NMP), serving as a dispersion medium.

A positive electrode protective layer slurry is prepared by mixing alumina powder, PVdF, carbon powder, and NMP, serving as a dispersion medium, in a mass ratio of 21:4:1:74.

The positive electrode mixture slurry and positive electrode protective layer slurry prepared as described above are applied to each side of an aluminum foil, serving as the positive electrode substrate 21a, using a die coater. The electrode is dried to remove NMP, serving as a dispersion medium, is pressed to a predetermined thickness using a roller press, and is cut to a predetermined size to form the positive electrode 21. The positive electrode 21 has the exposed region 4 of the positive electrode substrate 21a, where no positive electrode active material mixture layer 21b is formed, on each side of the positive electrode 21. The exposed region 4 of the positive electrode substrate 21a extends longitudinally along one lateral edge of the positive electrode 21.

Fabrication of Negative Electrode

A negative electrode mixture slurry is prepared by dispersing graphite powder, serving as a negative electrode active material, carboxymethylcellulose (CMC), serving as a thickener, and styrene-butadiene rubber (SBR), serving as a binder, in water in a mass ratio of 98:1:1.

A negative electrode protective layer slurry is prepared by mixing alumina powder, a binder (acrylic resin), and NMP, serving as a dispersion medium, in a mass ratio of 30:0.9:69.1 and dispersing the mixture in a bead mill.

The negative electrode mixture slurry prepared as described above is applied to each side of a copper foil, serving as the negative electrode substrate 22a, using a die coater. The electrode is dried to remove water, serving as a dispersion medium, and is pressed to a predetermined thickness using a roller press. The negative electrode protective layer slurry prepared as described above is then applied to the negative electrode active material mixture layer 22b. The electrode is dried to remove NMP, serving as a dispersion medium, thus forming the negative electrode protective layer 22c. The electrode is cut to a predetermined size to form the negative electrode 22. The negative electrode 22 has the exposed region 5 of the negative electrode substrate 22a, where no negative electrode active material mixture layer 22b is formed, on each side of the negative electrode 22. The exposed region 5 of the negative electrode substrate 22a extends longitudinally along each lateral edge of the negative electrode 22.

Fabrication of Flat-Wound Electrode Assembly

The positive electrode 21 and negative electrode 22 fabricated as described above are wound together with a 20 μm thick polypropylene separator therebetween and are pressed into a flat shape to form the flat-wound electrode assembly 1. This is done such that the exposed region 4 of the positive electrode substrate 21a and the exposed region 5 of the negative electrode substrate 22a are wound at the opposite ends of the flat-wound electrode assembly 1 in the axial direction. The outermost layer of the flat-wound electrode assembly 1 is formed by the separator.

Preparation of Nonaqueous Liquid Electrolyte

A solvent mixture is prepared by mixing ethylene carbonate (EC), ethyl methyl carbonate (EMC), and dimethyl carbonate (DMC) in a volume ratio (at 25° C. and 1 atm) of 3:3:4. LiPF is added as a solute to the solvent mixture in an amount of 1 mol/L. Lithium fluorosulfonate is then added to the solvent mixture in an amount of 1% by mass of the nonaqueous liquid electrolyte.

Formation of Conduction Path

The process of forming the conduction path, including the current-interrupting mechanism 50, of the positive electrode will now be described. A resin outer insulator 11 is placed on the top surface of an aluminum sealing member 3. A resin first insulator 10 and a conductor 51 made of aluminum are placed on the bottom surface of the sealing member 3. The insertion portion 7b of a positive electrode terminal 7 made of aluminum is inserted into through-holes formed in the outer insulator 11, the sealing member 3, the first insulator 10, and the conductor 51. The end of the insertion portion 7b is crimped to hold together the positive electrode terminal 7, the outer insulator 11, the sealing member 3, the first insulator 10, and the conductor 51. The joint between the end of the insertion portion 7b and the conductor 51 is laser-welded.

The periphery of the deformable plate 52 is then laser-welded to the lower edge of the cylindrical portion of the cup-shaped conductor 51 to seal the lower end of the cylindrical portion of the conductor 51. The deformable plate 52 is a thin aluminum plate protruding downward.

A resin second insulator 53 is placed on the bottom surface of the deformable plate 52 and is attached to the first insulator 10 in a latching manner. A protrusion on the bottom surface of the second insulator 53 is inserted into a through-hole formed in the base 6a of an aluminum positive electrode current collector 6. The end of the protrusion is heated and widened to hold together the base 6a of the positive electrode current collector 6 and the second insulator 53. The through-hole 7x is filled with $N_2$ gas to a predetermined pressure from the top of the positive electrode terminal 7 to press the deformable plate 52 against the base 6a of the positive electrode current collector 6. The base 6a is laser-welded to the deformable plate 52. The terminal plug 18 is inserted into the through-hole 7x of the positive electrode terminal 7.

The conduction path of the negative electrode is formed as follows. A resin outer insulator 13 is placed on the top surface of the sealing member 3. A resin inner insulator 12 and the negative electrode current collector 8 are placed on the bottom surface of the sealing member 3. The insertion portion 9b of the negative electrode terminal 9 is inserted into through-holes formed in the outer insulator 13, the sealing member 3, the inner insulator 12, and the negative electrode current collector 8. The end of the insertion portion 9b is crimped to hold together the negative electrode terminal 9, the outer insulator 13, the sealing member 3, the inner insulator 12, and the negative electrode current collector 8. The joint between the end of the insertion portion 9b and the negative electrode current collector 8 is laser-welded.

Assembly of Nonaqueous Electrolyte Secondary Battery

The positive electrode current collector 6 attached to the sealing member 3 as described above is joined to the exposed region 4 of the positive electrode substrate 21a of the wound electrode assembly 1 by resistance welding. The negative electrode current collector 8 attached to the sealing member 3 as described above is joined to the exposed region 5 of the negative electrode substrate 22a of the wound electrode assembly 1 by resistance welding.

The wound electrode assembly 1 is covered with a box-shaped insulating sheet 14 and is inserted into a prismatic housing 2 made of aluminum. The sealing member 3 is fitted and laser-welded to the prismatic housing 2. The nonaqueous liquid electrolyte prepared as described above is injected through the liquid electrolyte inlet 15 of the sealing member 3. The liquid electrolyte inlet 15 is sealed with the sealing plug 16 to obtain the nonaqueous electrolyte secondary battery 20.

Example 1

A nonaqueous electrolyte secondary battery of Example 1 was fabricated as described above.

Comparative Example 1

A nonaqueous electrolyte secondary battery of Comparative Example 1 was fabricated as in Example 1 except that the positive electrode active material mixture layer 21b contained no lithium phosphate and the nonaqueous electrolyte contained no lithium fluorosulfonate.

Comparative Example 2

A nonaqueous electrolyte secondary battery of Comparative Example 2 was fabricated as in Example 1 except that the positive electrode active material mixture layer 21b contained no lithium phosphate.

The low-temperature output characteristics, high-temperature storage characteristics, and overcharge characteristics of the nonaqueous electrolyte secondary batteries of Example 1 and Comparative Examples 1 and 2 were measured by the following procedures.

Low-Temperature Output Characteristics Measurement

Each nonaqueous electrolyte secondary battery was charged at a charge current of 2 A to a charge depth of 27% (SOC 27%) at 25° C. and was then allowed to stand at −30° C. for 5 hours. Thereafter, the nonaqueous electrolyte secondary battery was discharged at 10, 20, 30, 40, 50, 60, 70, or 80 A for 10 seconds. The battery voltage was measured after discharge at each current and was plotted against the current. The low-temperature output characteristics were determined as the output calculated from the I-V characteristics for discharge. The charge depth after discharge was returned to the initial charge depth by charging the battery at a constant current of 2 A.

High-Temperature Storage Characteristics Measurement

Each nonaqueous electrolyte secondary battery was charged at a constant current of 4 A to a voltage of 4.1 V at 25° C. and was then charged at a constant voltage of 4.1 V for 2 hours. Thereafter, the nonaqueous electrolyte secondary battery was discharged at a constant current of 4 A to a voltage of 3 V and was then discharged at a constant voltage of 3 V for 3 hours. The discharge capacity during this process was measured to determine the initial battery capacity.

Next, the nonaqueous electrolyte secondary battery was charged at a constant current of 2 A to a charge depth of 80% (SOC 80%) at 25° C. and was then allowed to stand at 60° C. for 100 days. Thereafter, the nonaqueous electrolyte secondary battery was charged at a constant current of 4 A to a voltage of 4.1 V at 25° C. and was then charged at a constant voltage of 4.1 V for 2 hours. Thereafter, the nonaqueous electrolyte secondary battery was discharged at a constant current of 4 A to a voltage of 3 V and was then discharged at a constant voltage of 3 V for 3 hours. The discharge capacity during this process was measured to determine the battery capacity after storage at high temperature. The capacity retention was calculated as the percentage of the battery capacity after storage at high temperature to the initial battery capacity.

Overcharge Test

Each nonaqueous electrolyte secondary battery was charged at a charge current of 4 A to a charge depth of 100% (SOC 100%) at 25° C. and was then allowed to stand at 60° C. for 2 hours. Thereafter, the nonaqueous electrolyte secondary battery was charged at a charge current of 125 A until the current was interrupted due to the activation of the current-interrupting mechanism or other reasons.

Table 1 summarizes the results of the low-temperature output characteristics, high-temperature storage characteristics, and overcharge characteristics measurements for the nonaqueous electrolyte secondary batteries of Example 1 and Comparative Examples 1 and 2. In Table 1, the result of the low-temperature output characteristics measurement for Example 1 is expressed as 100%, and the results of the low-temperature output characteristics measurements for Comparative Examples 1 and 2 are expressed as percentages relative to that for Example 1.

TABLE 1

| | Low-temperature output characteristics (%) | High-temperature storage characteristics (%) | Overcharge test |
|---|---|---|---|
| Example 1 | 100 | 88 | No abnormal behavior |
| Comparative Example 1 | 69 | 85 | Internal firing |
| Comparative Example 2 | 91 | 88 | Internal firing |

As shown in Table 1, the nonaqueous electrolyte secondary battery of Example 1, in which the positive electrode active material mixture layer contained lithium carbonate and lithium phosphate and the nonaqueous electrolyte contained lithium fluorosulfonate, had good low-temperature output characteristics and high-temperature storage characteristics and was reliable with no abnormal behavior upon overcharge. These results can be explained as follows.

The addition of lithium fluorosulfonate improves the low-temperature output characteristics and the capacity retention after storage at high temperature probably because it adsorbs onto the positive and negative electrode active materials to reduce the reaction resistance at low temperature and also inhibits irreversible lithium formation through the reaction with the liquid electrolyte. A comparison between Example 1 and Comparative Example 2 shows that the addition of lithium phosphate to the positive electrode active material mixture layer produces a synergistic effect with lithium fluorosulfonate to further improve the low-temperature output characteristics of the nonaqueous electrolyte secondary battery. The addition of lithium carbonate and lithium phosphate to the positive electrode active material mixture layer allows the current-interrupting mechanism to activate immediately and also inhibits heat generation and abnormal reactions in the battery. This is probably because lithium carbonate emits the amount of gas required to activate the current-interrupting mechanism within a short period of time, and lithium phosphate inhibits oxidative degradation of the liquid electrolyte upon overcharge and thus inhibits heat generation due to oxidative degradation of the liquid electrolyte.

As discussed above, the present invention provides a nonaqueous electrolyte secondary battery with good low-temperature output characteristics and high-temperature storage characteristics.

Lithium carbonate is preferably present in the positive electrode active material mixture layer in an amount of 0.1% to 5% by mass, more preferably 0.5% to 4% by mass, even more preferably 1% to 3% by mass, of the positive electrode active material present in the positive electrode active material mixture layer.

Lithium phosphate is preferably present in the positive electrode active material mixture layer in an amount of 0.1% to 5%, more preferably 0.5% to 4%, even more preferably 1% to 3%, of the mass of the positive electrode active material present in the positive electrode active material mixture layer.

Lithium fluorosulfonate is preferably present in the nonaqueous electrolyte in an amount of 0.25% to 2.5%, more preferably 0.5% to 2%, even more preferably 0.75% to 1.5%, of the total mass of the nonaqueous electrolyte. These are the amounts of lithium fluorosulfonate present in the nonaqueous electrolyte during the fabrication of the battery.

Pressure-Sensitive Short-Circuiting Mechanism

Figure 5A:
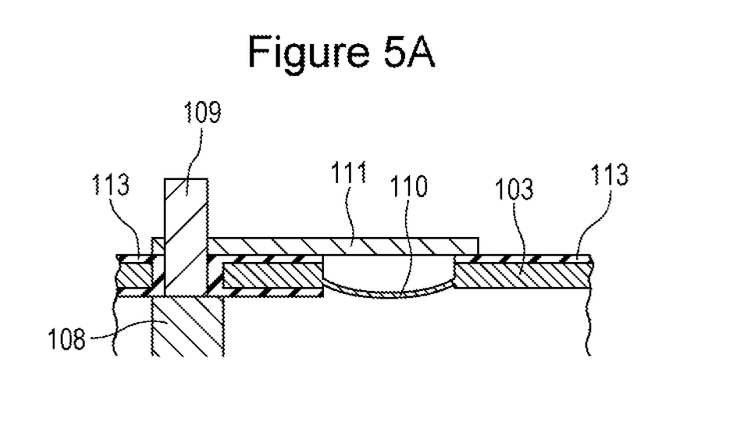
FIG. 5A is a sectional view of a short-circuiting mechanism before activation.
Figure 5B:
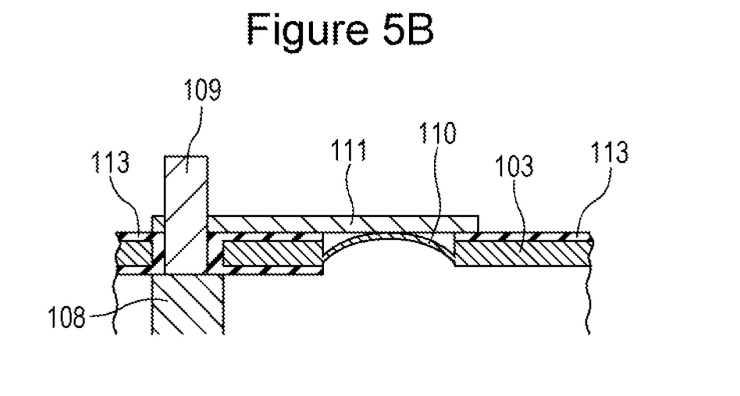
FIG. 5B is a sectional view of the short-circuiting mechanism after activation.

The current-interrupting mechanism 50 may be replaced with a short-circuiting mechanism serving as a pressure-sensitive safety mechanism. The pressure-sensitive short-circuiting mechanism is preferably disposed near the sealing member. FIG. 5A is a sectional view of a short-circuiting mechanism 80 before activation. Figure 5B is a sectional view of the short-circuiting mechanism 80 after activation.

As shown in FIG. 5A, a metal sealing member 103 includes an invertible portion 110 electrically connected to the positive electrode. A metal receiving member 111 electrically connected to the negative electrode is disposed outside the invertible portion 110. In FIG. 5A, the receiving member 111 is connected to a negative electrode terminal 109. The negative electrode terminal 109 is connected to the negative electrode via a negative electrode current collector 108. The receiving member 111, the negative electrode terminal 109, and the negative electrode current collector 108 are electrically insulated from the sealing member 103 by an insulator 113. Preferably, the invertible portion 110 is of unitary construction with the sealing member 103, and the sealing member 103 is electrically connected to the positive electrode.

As shown in FIG. 5B, when the internal pressure of the nonaqueous electrolyte secondary battery reaches a predetermined level or higher upon overcharge, the invertible portion 110 is inverted outward (upward in FIG. 5B) to contact the receiving member 111. The contact between the invertible portion 110, which is made of a metal and is electrically connected to the positive electrode, and the receiving member 111, which is electrically connected to the negative electrode, results in a short circuit between the positive and negative electrodes outside the electrode assembly. This prevents the nonaqueous electrolyte secondary battery from overcharging further and allows the energy inside the electrode assembly to be consumed outside the electrode assembly. This nonaqueous electrolyte secondary battery is therefore reliable against overcharge.

Figure 6:
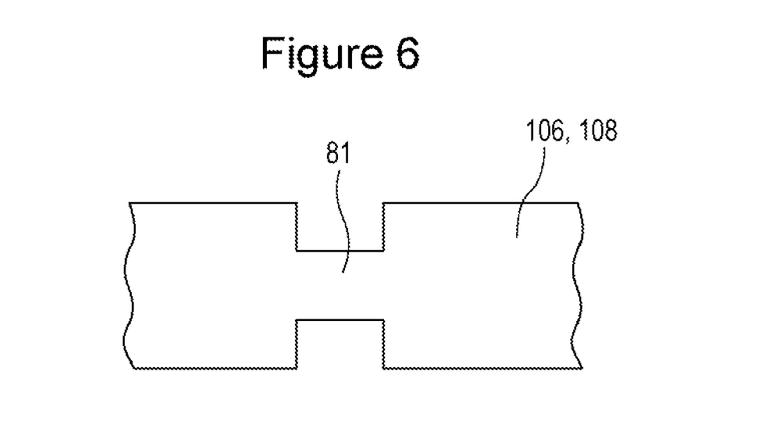
FIG. 6 shows a positive electrode current collector including a fusible portion.

As shown in FIG. 6, a fusible portion 81 may be provided, for example, in the positive electrode current collector 106 or the negative electrode current collector 108. The fusible portion 81 has a smaller cross-sectional area than the other portion. The fusible portion 81 is blown by a short-circuit current upon activation of the short-circuiting mechanism 80. This more reliably prevents the nonaqueous electrolyte secondary battery from overcharging further.

The positive electrode active material used in the present invention is preferably a lithium transition metal oxide. Examples of lithium transition metal oxides include lithium cobaltate ($Li_{1+a}CoO_2$ (where $0 \leq a \leq 0.2$)), lithium manganate ($Li_{1+a}Mn_2O_4$ (where $0 \leq a \leq 0.2$)), lithium nickelate ($Li_{1+a}NiO_2$ (where $0 \leq a \leq 0.2$)), lithium nickel manganese oxide ($Li_{1+a}Ni_{1-x}Mn_xO_2$ (where $0 \leq a \leq 0.2$ and $0 < x < 1$)), lithium nickel cobalt oxide ($Li_{1+a}Ni_{1-x}Co_xO_2$ (where $0 \leq a \leq 0.2$ and $0 < x < 1$)), and lithium nickel cobalt manganese oxide ($Li_{1+a}Ni_xCo_yMnO_2$ (where $0 \leq a \leq 0.2$, $0 < x < 1$, $0 < y < 1$, $0 < z < 1$, and $x+y+z=1$)). These lithium transition metal oxides may contain other elements such as aluminum, titanium, zirconium, niobium, boron, tungsten, magnesium, and molybdenum. One such example is a lithium transition metal oxide represented by the formula $Li_{1+a}Ni_xCo_yMn_zM_bO_2$ (where M is at least one element selected from aluminum, titanium, zirconium, niobium, boron, magnesium, and molybdenum, $0 \leq a \leq 0.2$, $0.2 \leq x \leq 0.5$, $0.2 \leq y \leq 0.5$, $0.2 \leq z \leq 0.4$, $0 \leq b \leq 0.02$, and $a+b+x+y+z=1$)). A preferred positive electrode active material is a lithium nickel cobalt manganese oxide containing zirconium and tungsten.

The negative electrode active material may be a carbonaceous material capable of absorbing and desorbing lithium ions. Examples of carbonaceous materials capable of absorbing and desorbing lithium ions include graphite, non-graphitizable carbon, graphitizable carbon, fibrous carbon, coke, and carbon black. Among these, graphite is preferred. Examples of noncarbonaceous materials include silicon, tin, and alloys and oxides thereof The nonaqueous electrolyte may contain nonaqueous solvents (organic solvents) such as carbonates, lactones, ethers, ketones, esters, and mixtures thereof. Examples of such nonaqueous solvents include cyclic carbonates such as ethylene carbonate, propylene carbonate, and butylene carbonate and linear carbonates such as dimethyl carbonate, ethyl methyl carbonate, and diethyl carbonate. In particular, mixtures of cyclic carbonates and linear carbonates are preferred. The nonaqueous electrolyte may also contain unsaturated cyclic carbonates such as vinylene carbonate (VC).

The nonaqueous electrolyte may contain electrolyte salts commonly used in conventional lithium-ion secondary batteries. Examples of such electrolyte salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, $LiP(C_2O_4)F_4$, and mixtures thereof. Among these, $LiPF_6$ is preferred. The electrolyte salt is preferably dissolved in the nonaqueous solvent in an amount of 0.5 to 2.0 mol/L. In particular, the nonaqueous electrolyte preferably contains $LiPF_6$ and $LiB(C_2O_4)_2$.

The separator is preferably a porous separator made of a polyolefin such as polypropylene (PP) or polyethylene (PE). Particularly preferred are separators having a three-layer structure of PP and PE (PP/PE/PP or PE/PP/PE). Alternatively, the separator may be a polymer electrolyte.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
   an electrode assembly comprising a positive electrode and a negative electrode, the positive electrode comprising a positive electrode active material, lithium carbonate, and lithium phosphate, the negative electrode comprising a negative electrode active material; and a nonaqueous electrolyte containing lithium fluorosulfonate.

2. The nonaqueous electrolyte secondary battery according to claim 1, further comprising:
   a housing having an opening and containing the electrode assembly and the nonaqueous electrolyte;
   a sealing member sealing the opening;
   a terminal attached to the sealing member and electrically connected to the positive electrode or the negative electrode; and
   a current-interrupting mechanism disposed on a conduction path between the positive electrode or the negative electrode and the terminal, the current-interrupting mechanism being activated to break the conduction path and thereby interrupt a current therethrough when the internal pressure of the battery reaches a predetermined level or higher.

3. The nonaqueous electrolyte secondary battery according to claim 1, further comprising:
   a housing having an opening and containing the electrode assembly and the nonaqueous electrolyte;
   a sealing member sealing the opening;
   a terminal attached to the sealing member and electrically connected to the positive electrode or the negative electrode; and
   a short-circuiting mechanism that is activated to forcedly short-circuit the positive electrode and the negative electrode when the internal pressure of the battery reaches a predetermined level or higher.

4. The nonaqueous electrolyte secondary battery according to claim 3, further comprising:
   a fusible portion disposed on a conduction path between the positive electrode or the negative electrode and the terminal, the fusible portion being blown by a short-circuit current upon activation of the short-circuiting mechanism.

5. The nonaqueous electrolyte secondary battery according to claim 1, wherein
   the positive electrode active material is a lithium transition metal oxide, and
   the negative electrode active material is a carbonaceous material.

6. The nonaqueous electrolyte secondary battery according to claim 1, wherein
   the lithium carbonate is 0.1% to 5% by mass relative to a total amount of the positive electrode active material,
   the lithium phosphate is 0.1% to 5% by mass relative to a total amount of the positive electrode active material, and
   the lithium fluorosulfonate is 0.25% to 2.5% by mass relative to a total amount of the nonaqueous electrolyte.

* * * * *